235-382 SR
1/6/87 OR 4,634,846

United States Patent [19]
Harvey et al.

[11] Patent Number: 4,634,846
[45] Date of Patent: Jan. 6, 1987

[54] MULTIMODE PROGRAMMABLE STAND-ALONE ACCESS CONTROL SYSTEM

[75] Inventors: Roy L. Harvey, Milton; Douglas Mason, Newton Center, both of Mass.

[73] Assignee: American District Telegraph Company, New York, N.Y.

[21] Appl. No.: 612,686

[22] Filed: May 22, 1984

[51] Int. Cl.[4] .................... G06K 5/00
[52] U.S. Cl. .................... 235/382; 235/375; 235/435; 340/825.31
[58] Field of Search .................... 235/375, 382, 382.5, 235/435; 340/365 UL, 825.31

[56] References Cited

U.S. PATENT DOCUMENTS 4,213,118 7/1980 Genest et al. .................... 235/382.5
4,385,366 5/1983 Housey .................... 340/365 UL
4,532,507 7/1985 Edson et al. .................... 340/825.31

*Primary Examiner*—David L. Trafton
*Attorney, Agent, or Firm*—Weingarten, Schurgin, Gagnebin & Hayes

[57] ABSTRACT

A card reader operated in proximity to secured area control point including an operating system therein to provide multiple operating modes. The card reader is operable to provide access to a secured area by entry of an identification code, which is read by the card reader, or entered to the keyboard. The user will be granted access to the controlled area when the user access requested corresponds to the level of access provided by the identification codes presented. The card reader has a programming mode, to allow a station manager to program the reader for presenting a programming code. The card reader system also has a degraded mode of operation, which allows user access after power fail and reader restart. A keypad having an interchangeable faceplate is used for all three modes of operation to provide communication and programming with the reader by the system user. The faceplates are selected to provide labels only for the active keypad areas, and to prevent disclosure of proprietary programming and service information to unauthorized individuals.

13 Claims, 6 Drawing Figures

FIG. 1
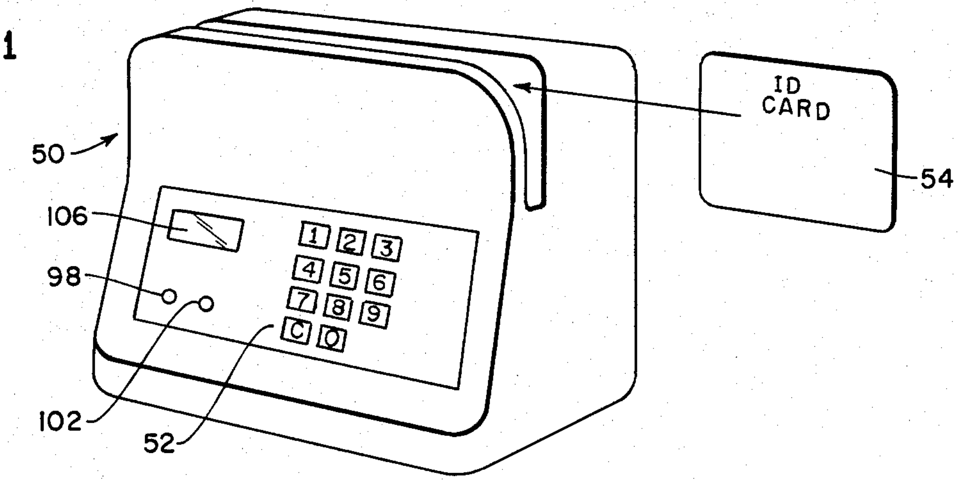
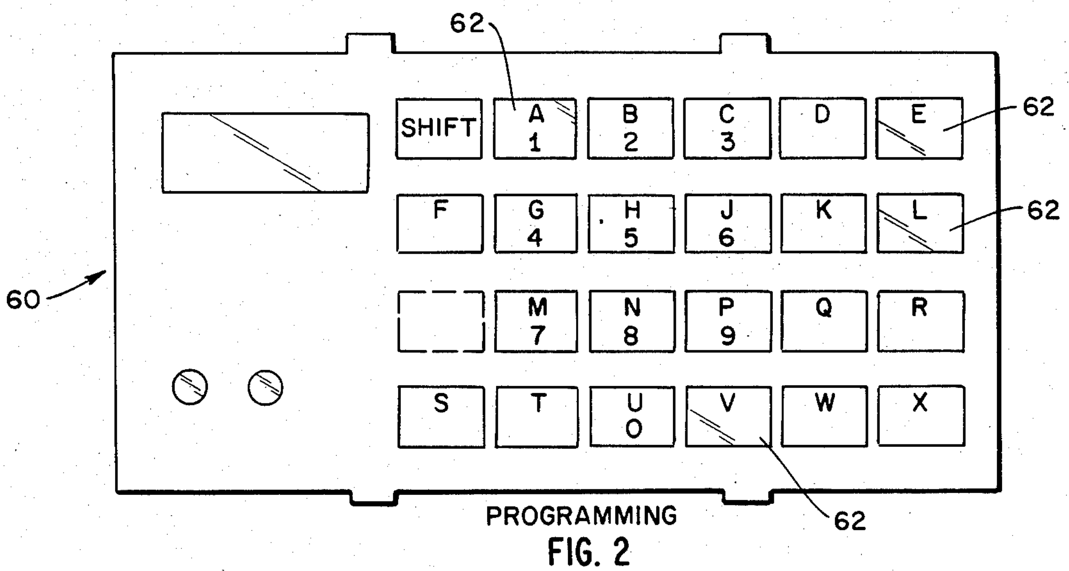
PROGRAMMING
FIG. 2
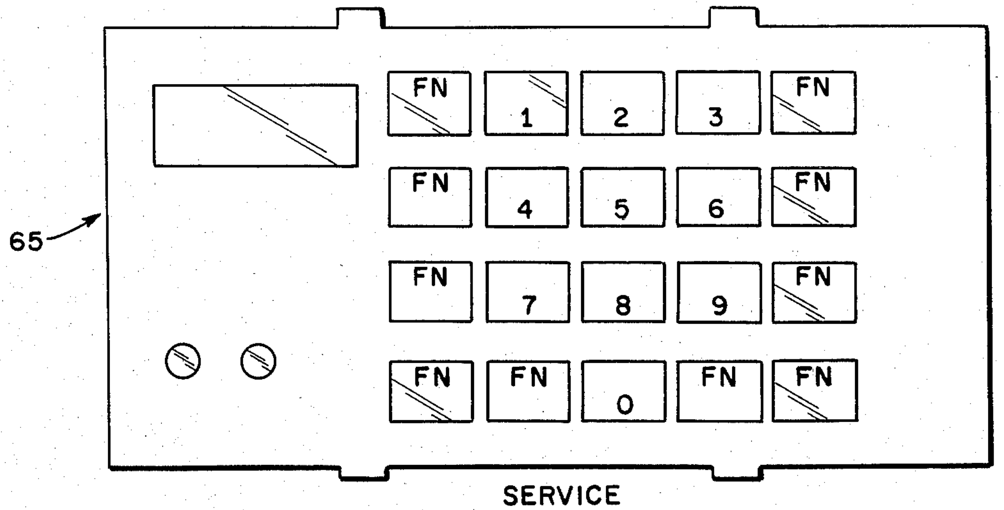
SERVICE
FIG. 3

MULTIMODE PROGRAMMABLE STAND-ALONE ACCESS CONTROL SYSTEM

FIELD OF THE INVENTION

The present invention relates to security systems, and in particular to access control security systems having multiple modes being operated through a programmably activated keypad having selectable labels placed thereon.

BACKGROUND OF THE INVENTION

Access control security systems are employed to provide a restricted or controlled entry to a particular place or controlled security area. Such systems typically require detailed information concerning the identity of the user, the associated passcodes, and the schedules during which the user will be permitted access to the controlled area. If the total information is sufficiently large in number of pieces of data, such data will be stored in a centralized location, typically with a control console. However, for many facilities, such centralized control for access control systems is undesirable or unfeasible. Under such conditions, the access control systems must be self-contained and reside within the card reader or code entry housing.

When the access control systems are self-contained, it is necessary to enter the particular data concerning the user identification, passcodes, and schedules. Typically, such information should not be entered in a manner which would permit unauthorized personnel to have an opportunity to enter the system. Entry of user information by remote data links or programmable cards also presents problems when the information to be loaded is significant in length, or where the unit is remote from the centralized database. However, complicated entry methods further inhibit the ease and reliability of data entry, thereby reducing the effectiveness of the access control system in environments in which large volumes of information are to be entered, or in which information changes frequently.

Moreover, in self-contained access control systems, the processor operation must provide all system functions including timer update, information database management and card and keyboard reading functions. Typically, the card reader signal may be monitored in sequence with the other system function. However, the card reader signal, typically a sequence of pulses derived from the passage of a magnetic medium through an analog sensing curcuit, has wide variations in signal characteristic, which may place a burden on the processor for accurate detection of encoded card signals. If the card reader signals are polled at widely spaced intervals, the card reader operation may be unreliable, or require careful processing to reconstruct a valid signal.

SUMMARY OF THE INVENTION

The access control system according to the present invention provides complete access control to a controlled security area for several hundred different users, programmable according to a total of eight schedules comprising the seven days and a holiday program. The access by the user is obtained by keycode entry, card only, or a combination of card and keycode entry.

The information provided to the access control system is entered in a keyboard having a selectable configuration, wherein different sets of the keypad are enabled according to a particular mode of security system operation. Moreover, the keypad retains removable faceplates wherein the key labels are attached to the keypad.

The access control system according to the present invention includes an operating system which is interrupted to read the user access card by a process which includes interrupt service routines, providing improved accuracy of bit length determinations and eliminates the software overhead of polling a port to determine the presence of a card signal.

The system is also operable in a degraded mode, wherein after the system is restarted following a power failure, a user will be admitted according to a subset of user data retained in the entry unit. The system according to the present invention provides flexibility in use, ease in programming, and reliability in operation after power failure.

BRIEF DESCRIPTION OF THE DRAWING

These and further features of the present invention will be further understood by reading the following detailed description, taken together with the following drawing, wherein:

FIG. 1 is a perspective view of the card reader housing of the security system according to the present invention;

FIG. 2 is a programming keypad overlay;

FIG. 3 is a service keypad overlay;

DETAILED DESCRIPTION OF THE INVENTION

Figure 4:
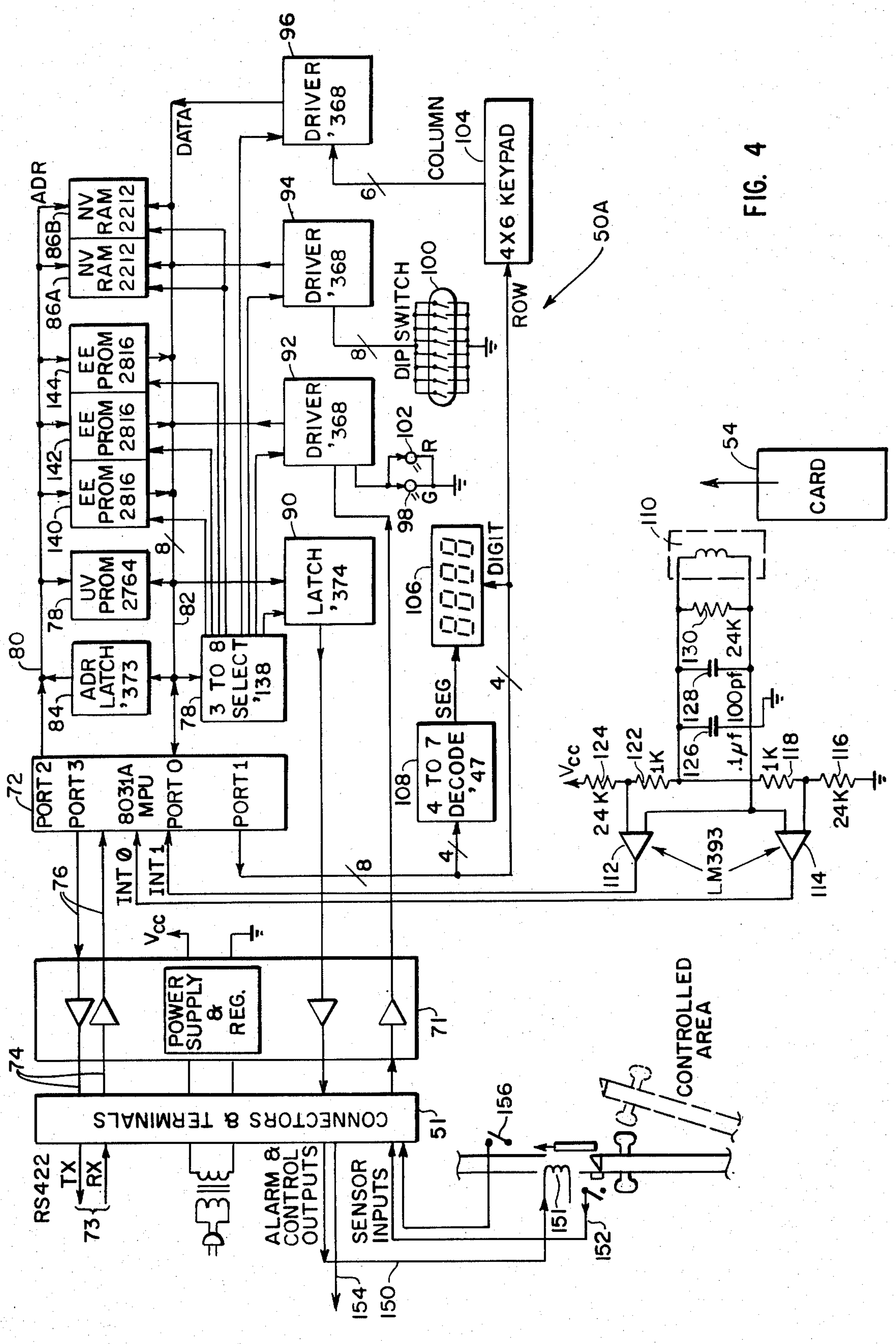
FIG. 4 is a partial schematic diagram of the security system according to the present invention.

There are three operating modes for the reader: (1) normal operating mode, (2) programming mode, and (3) degraded mode. In the normal operating mode, the reader admits any card, keycode, or card and keycode user if they are within their assigned access times. The programming mode may be accessed from normal operating mode, or degraded mode by presenting a programming mode card.

In normal operation, that is, in nonprogramming mode, the reader's keypad consists of 10 keys, as shown in Table 1 and FIG. 1.

TABLE 1

| |
|---|
| 123 |
| 456 |
| 789 |
| CLEAR 0 |

The keypad 52 is used solely for the user to enter his passcode when required. The digits 0–9 and "clear" are available.

To enter programming mode, the system "manager" merely runs a special "programming mode card" 54 through the reader 50. The card may require a keycode. The entire 24-key keyboard, shown in FIG. 2, becomes active, allowing full programming capability as described below. The programming mode card is any card with the proper site code, which is in the reader's database, and which has the programming mode attribute set.

Each reader 50 may have up to eight schedules (an On and Off time) for each eight days (Monday–Sunday and a Holiday programmable by the system manager). All users may be individually programmed to have entry during any or all of the programmed schedules. Schedules are permanent until redefined; there are no temporary schedules. Schedules may apply to all three types of users; keycode-only, card-only, or card and keycode.

While the reader is in programming mode, the system manager may display and/or change any system parameter (duress digit, time, day, etc.) or contents of the database (schedules, user's permitted schedules, etc.), void or validate any card or keycode, or print desired information from the database. A keyboard overlay 60 in FIG. 2 is required, as 12 "hidden" keys become activated giving a 24-key keypad for programming. The overlay 60 is inserted over the keypad 52 to provide the corresponding key label 62 directly over the respective key. The functions (A–X) and numbers 0–9, and shift key to select between functions and numbers, are shown generally on overlay 60. The system diagram 50A, discussed below, decodes the particular desired functions. If a key is not pressed for two full minutes, then programming mode is timed out, and the reader resumes normal operation.

A list of typical keypad and commands for the overlay 60 is given below in Table 2.

TABLE 2

| | | |
|---|---|---|
| 0 | CLEAR | SAT |
| 1 | DAY | SCHED |
| 2 | DMA | SCROLL |
| 3 | DURESS | SHUNT |
| 4 | FORGIVE | STORE |
| 5 | FRI | STRIKE |
| 6 | HOLIDAY | SUN |
| 7 | KEYCODE | THRU |
| 8 | LIMIT | THU |
| 9 | MON | TIME |
| AJAR | OFF | TUE |
| ATTMPT | ON | VOID |
| CARD | PRINT | WED |
| CHANGE | | |

An additional "service" mode may be included in the card reader 50, which is activated by the proper card and/or keycode entry. A different subset of the 24 keys may be activated, and have a corresponding service overly 65 of FIG. 3. The functions (FN) and numbers 0–9 are shown generally thereon.

The number of card users, 217, may be increased through two expansion options of 292 and 293 each, to a maximum of 802 cards.

An additional, optional feature includes antipassback, wherein a user is prevented from entering more than once without having exited, or from exiting without having first entered. The antipassback system configuration requires two readers, one on each side of portal, and has simple communication between the pair of readers which announces the entry/exit of users, with each reader keeping a data record of whether each user is "in" or "out" by setting or clearing corresponding antipassback bits. The antipassback data is stored in non-volatile RAM (NVRAM) to guard against loss when power fails.

Antipassback data can be reinitialized, which sets all antipassback bits to "allow entry" state. The system 50 includes an output which drives up to 2,640 feet of a twisted conductor pair, and may be extended with RS-422 compatible devices (e.g., RF, AC line).

As there is no battery backup, in case of reader restart (e.g., after powerfail or reconnection), the reader will assume degraded mode. In this mode, the reader will admit users regardless of schedules, as long as the reader is set for degraded mode access and the rest of the user's access procedure coincides with the information in the database (right card, valid key code, right card and keycode). Using a simple programming sequence, the reader may be set to allow or disallow degraded mode access. While the reader is in this mode, the display 106 will flash the time, and will not resume normal operation until the clock time and day is set (in programming mode).

Green light-emitting diodes (LEDs) 98 indicate a Go condition for any valid access; No-go (red) 102 indicates bad user card, or bad keycode or in response to a key, pressed while the keyboard is disabled.

To gain access (during both normal operations and degraded mode), the following steps are necessary. If a card is not required to gain access, skip step (1):

(1) The user presents his access card to the reader. If the card is permitted to access the reader at this time, the green "Go" LED will light and the strike will operate if a keycode is not required. If the reader is in degraded mode, the reader must be set to allow degraded mode access, or the user must use the duress digit when entering his keycode in order to gain entry, which will cause a duress alarm.

(2) If a code is required, it may now be keyed in. The reader will prompt a card-and-keycode user for his keycode, when required, by clearing the display. If the user fails to initiate keycode entry within 15 seconds, or once he has initiated keycode entry, if he fails to enter a key within 30 seconds of the previous key, the reader will timeout and display the clock. If an error is made while typing in the keycode, the user may enter the "clear" key which will abort the current attempt and increment the keyboard error count. The user may then reenter the code until the proper code has been entered, or until the keyboard error limit has been exceeded. If the keyboard error limit is enabled (settable 1-10) and exceeded the keyboard is disabled for one minute, and the alarm output is activated. If a key is pressed while the keyboard is disabled, the red LED will light for a brief moment.

According to the present invention, the remote card reader diagram 50A is shown in FIG. 4, which also includes a power supply (56) and line driver board 71. System connectors and miscellaneous components reside on mounting card 51 to facilitate connection to external devices. Card reader circuit diagram 50A includes an MPU 72, which can communicate with external equipment such as another card reader 50 (not shown) through the mounting card 51 and the buffer card 71 on leads 73, 74 and 76, respectively. The MPU 72, Part No. 8031 by Intel Corporation of Sunnyvale, Calif., processes the signal according to a program stored on the ROM 78, typically Part No. 2764. The MPU 52 port 2 provides address signals on leads 80, and additional address signals from the 8-bit databus 82, captured by the address latch 84, typically Part No. 74LS373. In addition, transient information is stored in the non-volatile random access memory (NVRAM) 66A and 66B, connected in parallel, also receiving the address signals on leads 80 and data signals on leads 82. The NVRAM 86A and 86B are enabled by a signal provided by the 3-to-8 decoder 88, typically Part No. 74LS138. The MPU 52 communicates to additional or external circuits through latch 90, typcally Part No. 74LS374, and drivers 92, 94, and 96, typically Parts No. 74LS368. The latch 90 provides alarm and control output signals to the external environment, and the driver 92 receives sensor inputs from the external environment through the card 51, including known connector and driver elements. Moreover, the driver 94 provides signals to indicator light emitting diodes (LEDs) 98 and 102, whose function is discussed below. An eight position dual-in-line package switch 100, retained on board 51 is read by driver 94, for functions described below. External card user signals are received by the system MPU 72 through the driver 96 from a matrix keypad 104 wherein a sequence of four row signals is provided from the MPU 72 port 1, the corresponding orthogonal sense lines being received by the driver 96 and read therein upon select signal provided by select decoder 88 according to techniques known in the art. Similarly, the drivers 92 and 94, as well as latch 90 are enabled by select signals provided by the decoder 88 according to signals generated by the MPU 72 and received over the address bus 82. In addition, a four-digit, seven-segment display 106 is provided wherein the segments are driven by a four-to-seven segment decoder 108 being drive from the MPU 72 port 1; similarly, the digits are selected by the remaining four bits of port 1 signals.

The card reader further includes a card reader coil 110 producing a pulse signal upon presentation of the card 54 as taught by the manufacturer Sensor Engineering of Hamden, Conn., the manufacturer's information being incorporated by reference. The signal produced by the sensing coil 110 is received by a pair of comparators 112 and 114 to detect negative and positive transitions thereof. The transitions are determined by referencing the signal produced by the sensing coil 110 to a voltage divider comprising resistors 116, 118, 122, and 124, as shown in FIG. 4, which provides a modest signal dead zone in which neither comparator 112 nor 114 produces an output. The voltage divider midpoint is bypassed to ground by a capacitor 126 similarly a shunt capacitance 128 and resistance 130 is provided across coil 110 to provide the desired damped pulse response.

All card readers 50 incorporate the 38-bit format currently being supplied by Sensor Engineering. The format of these cards is shown in Table 3:

TABLE 3

| |
|---|
| system code bits |
| card code bits |
| parity bits |
| fixed bits |

Each reader comes equipped with three programming cards, preset in the database. If the user requires new cards, they must be ordered and installed by the manufacturer.

Figure 5:
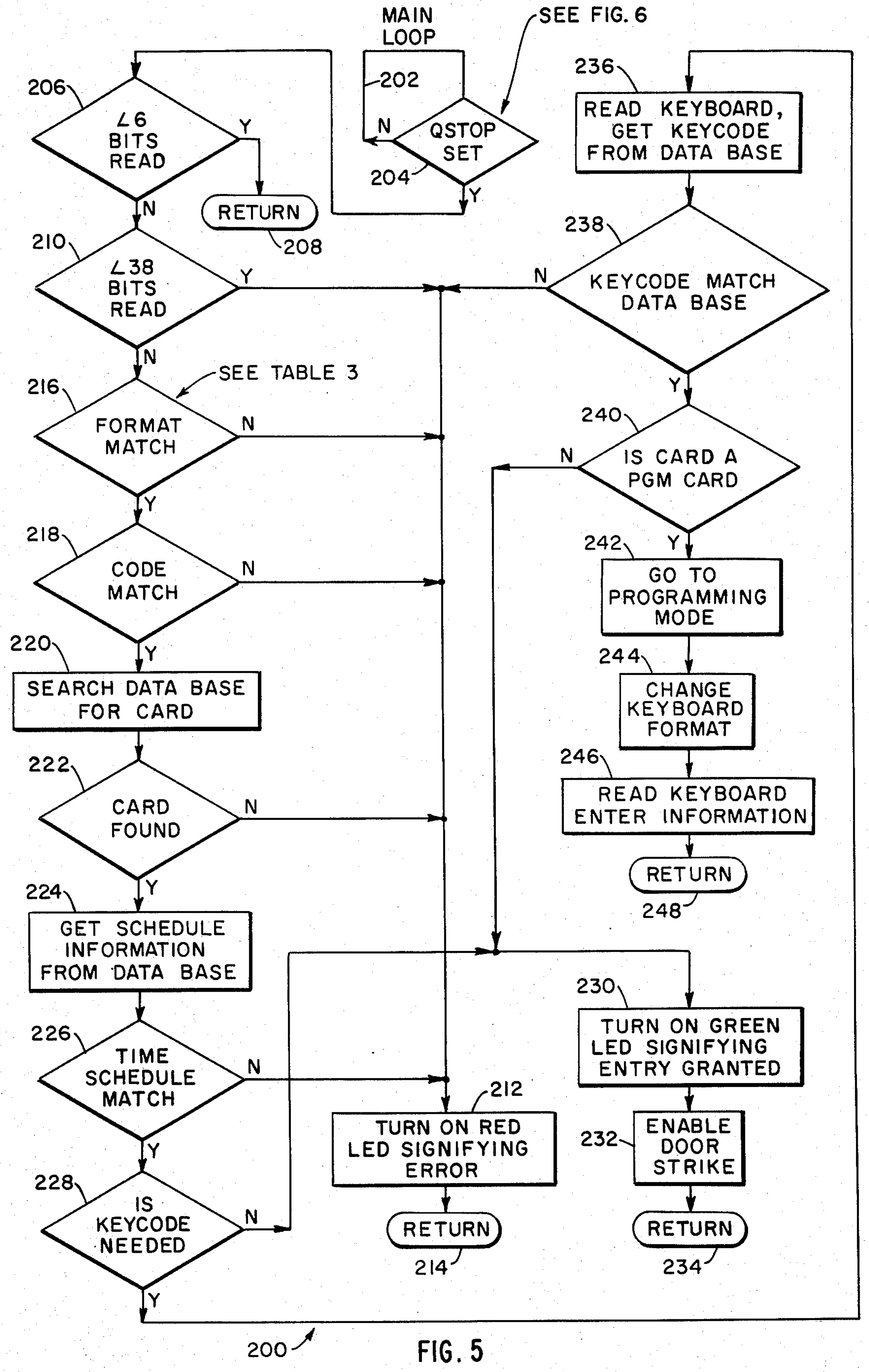
FIG. 5 is a flow chart showing card decoding and keyboard subroutines.

A flow chart 200 of the access control system according to the present invention is shown in FIG. 5. The main loop 202 of the system performs the necessary system overhead functions until a card is read and the last bit detected, at step 204. If a card having less than six bits or less than six bits of a card have been read at step 206, the subroutine returns without error at step 208. If six bits or more have been read, but less than 38 bits read at step 210, a red LED is turned on at step 212, signifying an error condition; thereafter, a subroutine returns at step 214. If 38 bits or more have been read, the format is tested at step 216, the format being shown in Table 3, above. If the format does not match, an error is indicated at step 212, as discussed above. If the format does match the system format, the code is tested at step 218. If the code does not match, the error condition is indicated at step 212. If the code does match, the system database is searched for a card having data matching the card at step 220. The card is tested with the data at step 222, whereupon a failure to match with the database data causes an error indication at step 212. If a match is found, schedule information is recovered from the database at step 224. Next, the current time is compared to the schedule time at step 226. If they do not match, an error condition is indicated at step 212. If the current time and schedule match, the card information is tested to see if a keycode is necessary at step 228. If a keycode is not required, a green LED is turned on, signifying that entry is granted at step 230. The door strike is enabled at step 332, and the subroutine returns to the main loop operation at step 234.

If a keycode is indicated at step 228, the keyboard is read and the database is interrogated at step 236. The keycode is matched to the database at step 238, whereupon a failure to match causes an error condition to be indicated at step 212. If the keycode matches the database value, the program checks the identity of the card, that is to see if the card entered is a "programming" card at step 240. If the card is not a programming card, typically used by a system manager, the system turns on the green LED to grant entry at step 230, and thereafter permits entry at step 232, and so forth. If the card entered is a programming card, the system enters programming mode at step 242, whereupon the keyboard format is changed at step 244 to enable the additional keypad switches formerly unused in the normal input mode. Next, the information is entered into the fully expanded keyboard at step 246, and entered into the system database. Thereafter, the subroutine returns at step 248.

Figure 6:
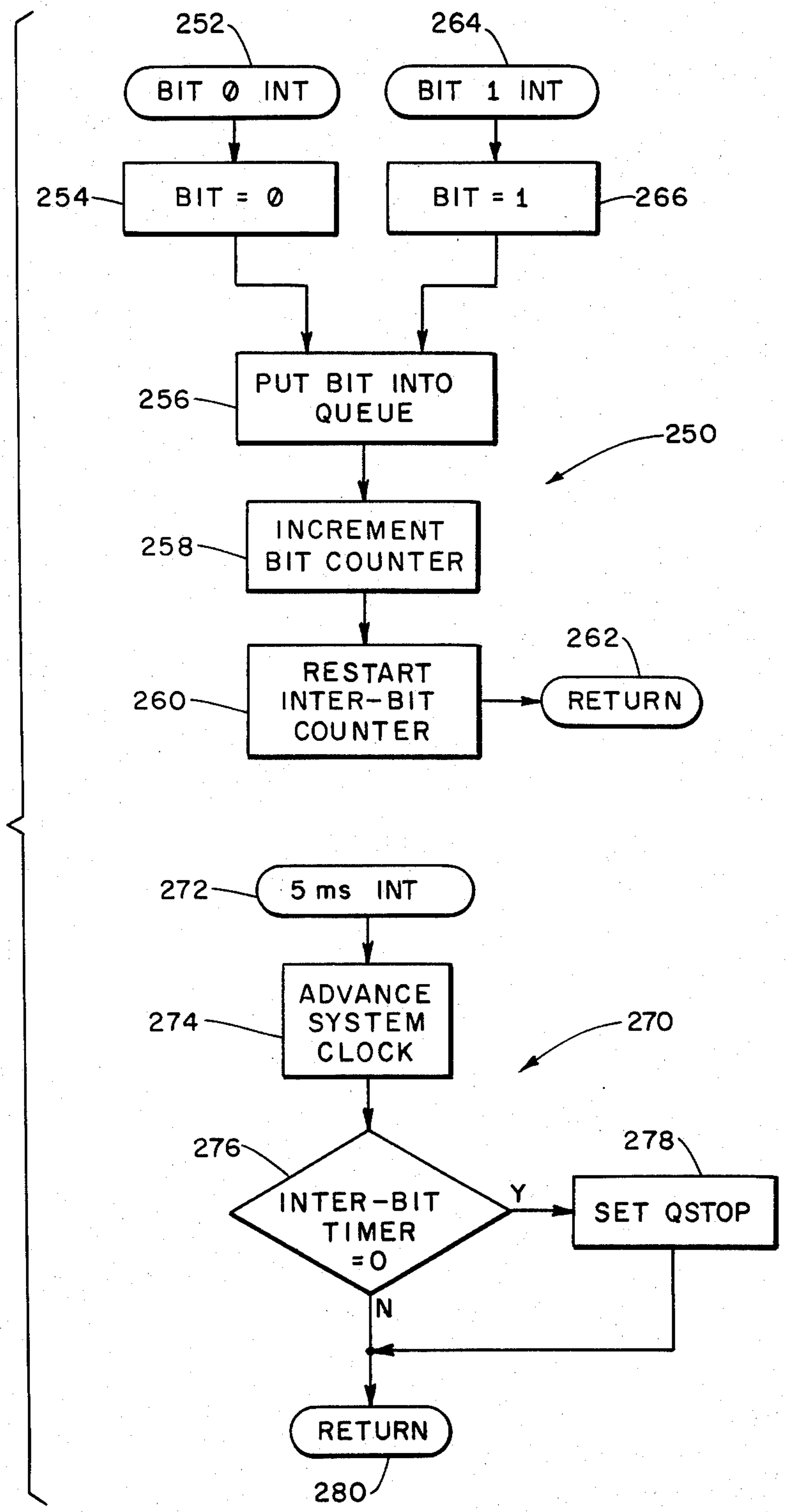
FIG. 6 is a flow chart showing interrupt processing of card reader signals.

According to the present invention, the system first determines if the string of data to be received from a card read is now complete as indicated by the test step 204. This determination is provided by a combination of asynchronous data entry according to the flow chart 250 and a periodic timer function 270, shown together in FIG. 6. The bit zero interrupt condition 252 is generated upon receipt of a pulse from a comparator 114 shown in FIG. 4. The bit value is set to zero at step 254 and put into the bit queue at step 256. The bit counter is incremented (to be tested in steps 206 and 210, above) at step 258. Meanwhile, before the bit zero interrupt condition was invoked at step 252, an inter-bit timer 260 was accumulating in value. If sufficient time has accumulated, the system clock is advanced at step 274 from a periodic 5-millisecond interrupt at step 272, such that a zero value in the interrupt timer at step 276 causes the queue stop parameter to be set at step 278 to indicate the completion of a sequence of card data pulses. The subroutines return at steps 262 and 280, respectively. Similarly, a bit one interrupt condition 265 is generated upon receipt of a pulse signal from comparator 112, whereupon the bit value is set at one step 266. The data is put into the bit queue at step 256, the bit counter is incremented at step 258, and the inter-bit timer is reset at step 260. If the inter-bit timer is reset before reaching zero, the system does not indicate the end of card reader data entry, and subroutine returns at step 262.

There is no battery backup for the card reader 50. However, the card reader circuit 50A includes the electrically erasable programmable read only memories (EEPROM) 140, 142, and 144, typically comprising Part No. 2816 by Xicor of Milpitas, Calif., and additional backup non-volatile RAM (NVRAM) 86A and 86B, typically Part No. 2212, also made by Xicor. The EEPROMS 140–144 are enabled by the corresponding decoded signals from the select decoder 88, and the NVRAM 86A is connected in parallel with the NVRAM 86B, both receiving the identical address data and chip select signals. The EEPROMS 140–144 are used to store the long term infrequently changed information such as schedules, whereas the NVRAMs 86A and 86B are used to retain the more frequently changed information.

The present system supports an optional printer for logging console operations and alarms.

The reader's syscode is set in the field, and cannot be changed except by the card reader manufacturer.

The standard reader 50 will be able to accommodate 100 keycode-only users, and 217 card and/or optional keycode users. The number of card plus keycode users may be increased to 802 with expansion options.

All inputs are subject to a 50-millisecond software debouncing, hence momentary transitions (noise, etc.) will be ignored.

Relay contacts for lead 150 are provided for door strike 151 activation with 1 A, 24 VAC rating, and are active until programmable strike timer times out (1–10 seconds), or until Door Ajar Input 152 detects door opening, whichever occurs first.

The Alarm Shunt Output is normally off, SPDT relay contact for lead 154 with 1 A 24 VAC rating, and is programmable (0–30 seconds). The relay is activated just before the strike output. Output will resume the "off" state if the strike timer times out. The actual shunt timer does not begin until the reader senses door ajar.

The Door Ajar Input 152 is normally grounded and causes alarm if open longer than the programmable delay (1–30 seconds) time.

The Exit Switch Input 156 is normallly open. On grounding, it activates the door strike, and may be connected to a toggle switch. When invoked, the reader will initiate a valid access timing sequence, and will maintain an open strike without showing a green LED 98, if the exit push button is grounded longer than the strike timeout value.

The Alarm Output at 154 is activated by door ajar timeout, keyboard error counter limit overflow, or other alarm conditions. A relay contact with 1 A, 24 VAC rating is provided, which opens on alarm.

The case where the user fails to open the door before the strike times out is exactly the same as the case wherein there are no door contacts. That taken care of, assume in the following, that the user actually opens the door before the strike times out. The door opening marks the end of one transaction, and is the point where the reader is accessed. If the door is opened longer than is allowed, the reader will signal a local alarm. In any event, the door ajar and shunt timers will stop when either the user closes the door, or when the timers time out, whichever comes first.

All parameters are stored in nonvolatile RAM (NVRAM) 86A and 86B, discussed above. NVRAM parameters may be changed from the keypad and viewed on the display, using the change command while the reader is in programming mode. Initial values given below are those preprogrammed at the factory. When set, users are allowed to enter during degraded mode; when clear, users are denied all but duress entries. Initial mode is set. Strike time is programmable between 0–15 seconds, initial value of 3 seconds. Shunt time is programmable between 0–30 seconds with 2-second resolution and starts when strike time starts. A default value is 10 seconds. Door Ajar Delay is programmable between 0–30 seconds with 2-second resolution. The timeout starts when the user opens the door, signalled by door ajar input. The default time is 10 seconds. Duress Digit 0–9 may be selected, or disabled. Keyboard Error Counter Maximum Count 1–10 may be selected or disabled. A default value is 3.

A 24-hour time display keeps track of day of week, but not date; holidays may be programmed up to and including six days in advance; holidays automatically revert to normal days at midnight at the end of the holiday.

Any card in the database may be assigned programming privileges by means of a simple keyboard command. Programming mode privileges are not restricted to any schedules, are valid during degraded mode, and may require a keycode.

Duress is signalled by pressing a special digit before entering one's standard passcode. The user must enter all digits of his passcode after entering the duress digit. Typing the last digit of the keycode will cause the digits to scroll across the display 106, but as all digits appears as "u," the keyboard will not be legible.

The special duress digit is programmable, or may be disabled entirely. Entering the duress digit with a valid passcode initiates the normal access timing procedure (strike, door ajar, and shunt timers) and activiates the alarm output. A valid keycode with the duress digit will override the setting of the reader, but will ring a local alarm.

If the keyboard error counter option is enabled, the reader will count the number of bad keycodes typed in. If the number of sequential bad attempts exceeds the programmed number (1 to 10), the alarm output will be activated.

The present invention is not limited to the above-described embodiment. Additional embodiments, variations, and configurations, which may be made through substitutions of known parts by one skilled in the art, are within the scope of the present invention. Therefore, the present invention is not to be limited except according to the claims which follow.

What is claimed is:

1. A card reader for decoding a user passcard having digitally encoded information thereon according to a system format, comprising:

a card sensor producing a sensor signal, corresponding to the passcard encoded signal;

means for providing a first and a second signal corresponding to said sensor signal; and processor means for providing general card reader system processing and decoding of said passcard encoded signal according to said first and said second signal, wherein said first and said second signal each produce an interrupt condition in said processor, causing other system processing to become suspended and begin a first and a second interrupt service routine to process the first and second signals to decode the card signal, wherein said first and said second interrupt routines are operable to reconstruct the encoded digital signals from said first and said second digital signal.

2. The card reader of claim 1, wherein said processor further comprising means for comparing the reconstructed digital signal to said system format producing an error signal when said reconstructed signal is not in conformance thereto, further including means operable to provide a decoded signal according to said reconstructed digital signal and to transfer said decoded signal to a location within said processor for use in said general system processing.

3. The card reader of claim 1, further including a threshold detector means providing indication of the transition of said first threshold and said second threshold signals, means to provide a first threshold signal and a second threshold signal; and said means for providing a first and second signal being operable according to said threshold detector means.

4. The card reader of claim 1, wherein said processor means includes:

a plurality of keys forming a keyboard; and means to selectively enable each of said keys and accordingly receive key signals therefrom.

5. The card reader of claim 4, wherein said means to selectively enable is operable in a programming mode in response to a card sensor having a programming identification code therein, wherein said processor further comprises means to store data and is operable to receive new data when in said programming mode.

6. A computer system providing access according to a user passcard having digitally encoded information thereon according to a system format, comprising:

a card sensor producing a sensor signal, corresponding to the passcard encoded signal;

means for providing a first and a second signal corresponding to said sensor signal; and processor means for providing general card reader system processing and decoding of said passcard encoded signal according to said first and said second signal, wherein said first and second signal each produce an interrupt condition in said processor, causing other system processing to become suspended and begin a first and a second interrupt service routine to process the first and second signals to decode the card signal, wherein said first and said second interrupt routines are operable to reconstruct the encoded digital signals from said first and said second digital signal.

7. The system of claim 6, further comprising:

keyboard means having a plurality of keys selectively providing keyboard signals;

programmable code storage means providing a stored code signal to said processor means; and a keyboard faceplate selectively displaying the positions of said keys and the key labels corresponding to the data received therethrough.

8. The system of claim 7 being operable in a plurality of modes according to at least one of said passcard encoded signals and said previously received keyboard signals, said keyboard signals being selectively received according to each of said plurality of modes.

9. The system of claim 8, wherein said modes include:

a normal mode for access operation; and a programming mode for entering code signals into said programmable code storage means.

10. The system of claim 9, wherein said progamming mode is initiated after entry and receipt of said passcard encoded signals having a programming card identification thereon.

11. The system of claim 9, wherein said normal code includes selective activation of a first set of keyboard key functions; and said programming mode includes selective activation of a second set of keyboard key functions, wherein at least one of said first set and said second set of keyboard key functions share a common key, and said corresponding key functions are different according to said normal and said programming mode.

12. The system of claim 9, wherein said modes further include a service mode initiated after entry and receipt of said passcard encoded signal having a service card identifier therein, and having a corresponding set of keyboard keys activated.

13. The card reader of claim 6, further including a threshold detector means providing indication of the transition of said first threshold and said second threshold signals, means to provide a first threshold signal and a second threshold signal; and said means for providing a first and second signal being operable according to said threshold detector means.

* * * * *

UNITED STATES PATENT AND TRADEMARK OFFICE

CERTIFICATE OF CORRECTION

PATENT NO. : 4,634,846

DATED : January 6, 1987

INVENTOR(S) : Roy L. Harvey; Douglas Mason

It is certified that error appears in the above-identified patent and that said Letters Patent is hereby corrected as shown below:

Column 1, line 50, "signal-" should read --signal--

Column 3, line 49, "overly 65" should read --overlay 65--

Column 5, line 3, "typcally" should read --typically--
line 26, "being drive" should read --being driven--

Column 6, line 19, "step 332," should read --step 232,--
line 63, "at one step" should read --to one at step--

Column 8, line 34, "activiates" should read --activates--

Column 9, line 49, "first and second" should read --first and said second--

Column 10, line 20, "access operation;" should read --access control operation;--
line 23, "progamming" should read --programming--

Signed and Sealed this

Seventeenth Day of May, 1988

*Attest:*

DONALD J. QUIGG

*Attesting Officer* *Commissioner of Patents and Trademarks*